(12) United States Patent
Ishii

(10) Patent No.: US 7,030,738 B2
(45) Date of Patent: Apr. 18, 2006

(54) CAR-MOUNTED IMAGING APPARATUS AND DRIVING ASSISTANCE APPARATUS FOR CAR USING THE IMAGING APPARATUS

(75) Inventor: Hirotaka Ishii, Seto (JP)

(73) Assignee: Omron Corporation, Kyoto (JP)

( * ) Notice: Subject to any disclaimer, the term of this patent is extended or adjusted under 35 U.S.C. 154(b) by 195 days.

(21) Appl. No.: 10/688,788

(22) Filed: Oct. 16, 2003

(65) Prior Publication Data

US 2004/0109060 A1 Jun. 10, 2004

(30) Foreign Application Priority Data

Oct. 22, 2002 (JP) .............................. 2002-306706

(51) Int. Cl.
*B60Q 1/00* (2006.01)
(52) U.S. Cl. .............................. 340/425.5; 340/426.16; 340/435; 340/436; 340/901; 340/903
(58) Field of Classification Search ............ 340/425.5, 340/426.15, 426.16, 435, 436, 901, 903, 340/995.1, 426.23, 905; 348/143, 148, 161, 348/207.1, 607, 708, 135, 571, 625
See application file for complete search history.

(56) References Cited

U.S. PATENT DOCUMENTS 5,249,157 A * 9/1993 Taylor ........................ 340/903
5,835,028 A * 11/1998 Bender et al. .............. 340/937
6,340,994 B1 * 1/2002 Margulis et al. ............ 348/625

FOREIGN PATENT DOCUMENTS

WO   WO 00/51345 A1    8/2000

OTHER PUBLICATIONS

Patent Abstracts of Japan No. 07-298112 published Nov. 10, 1995 (1 page).

* cited by examiner

*Primary Examiner*—Hung Nguyen
(74) *Attorney, Agent, or Firm*—Osha Liang LLP

(57) ABSTRACT

The invention provides a car-mounted imaging apparatus that renders a frame rate variable and yet does not spoil image quality and does not either invite the drop of sensitivity and deterioration of an S/N ratio. The car-mounted imaging apparatus 1 has two-dimensional imaging means (pixel unit 3, vertical scanning unit 4, horizontal scanning unit 5, output unit 7) having a large number of pixels 2 arranged in a two-dimensional matrix, and pixel information addition means (pixel switch control unit 8) for combining a plurality of pixels 2 and adding and extracting their pixel information. When the number of combination of the pixels 2 is changed, a frame rate becomes variable.

4 Claims, 12 Drawing Sheets

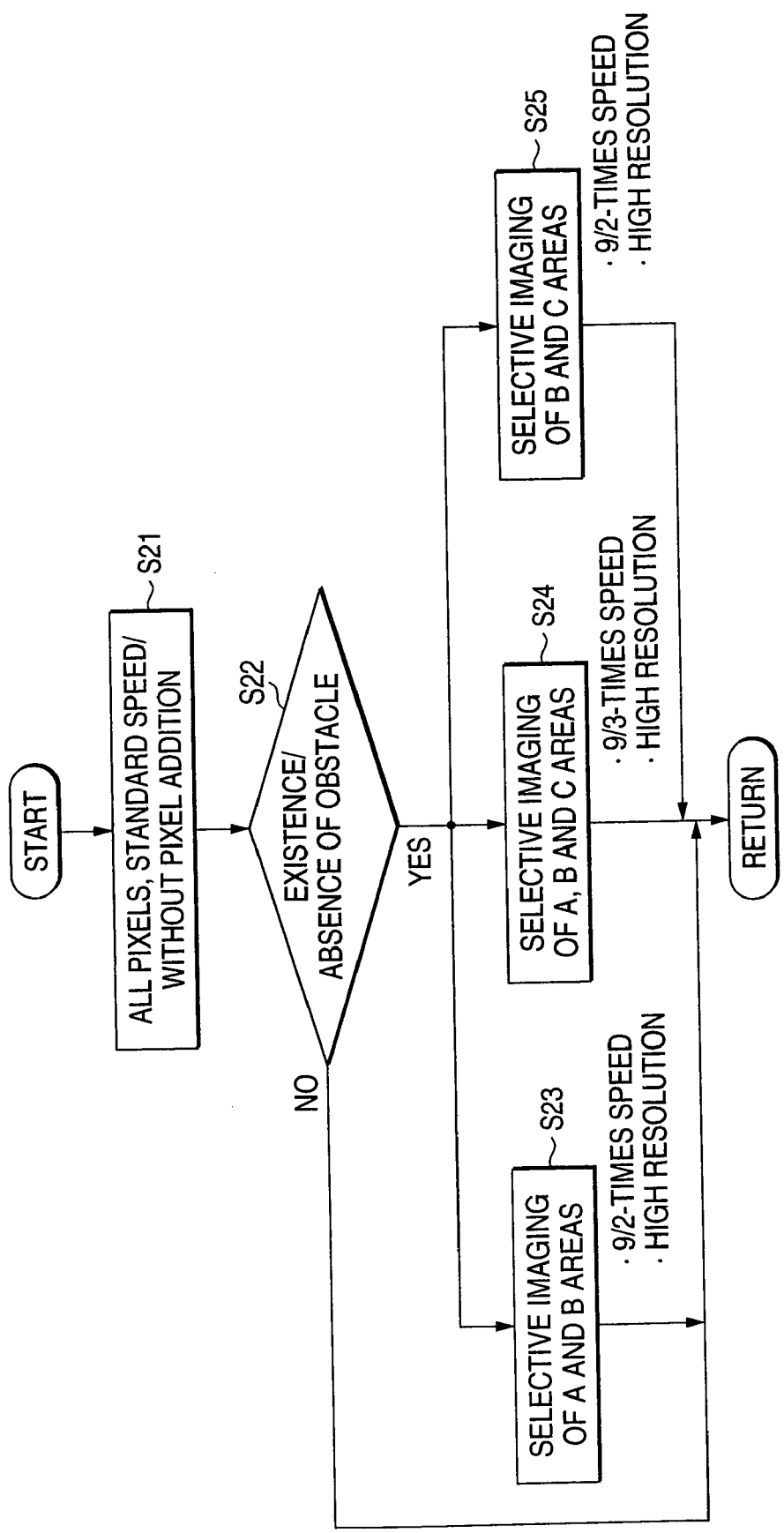

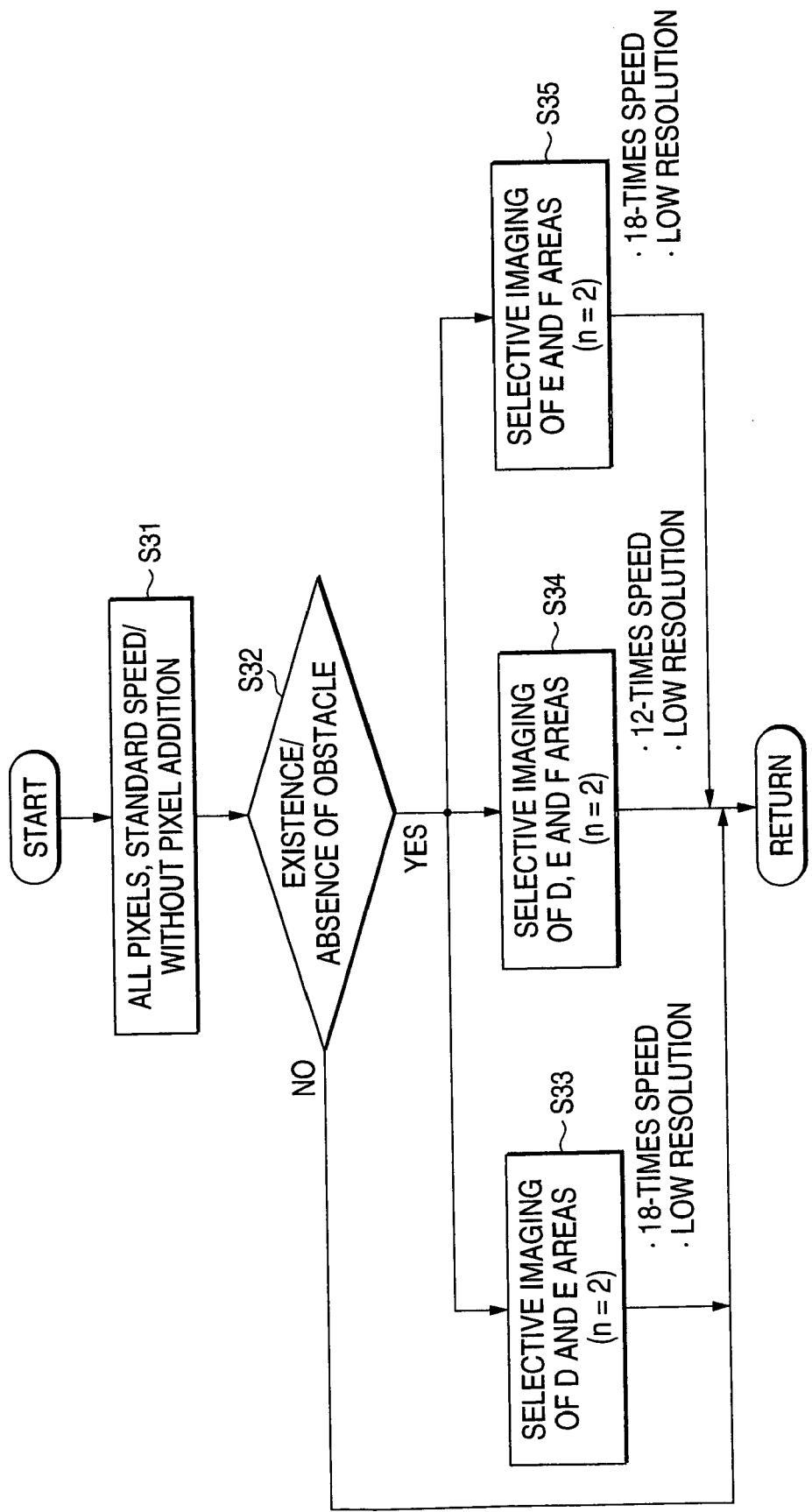

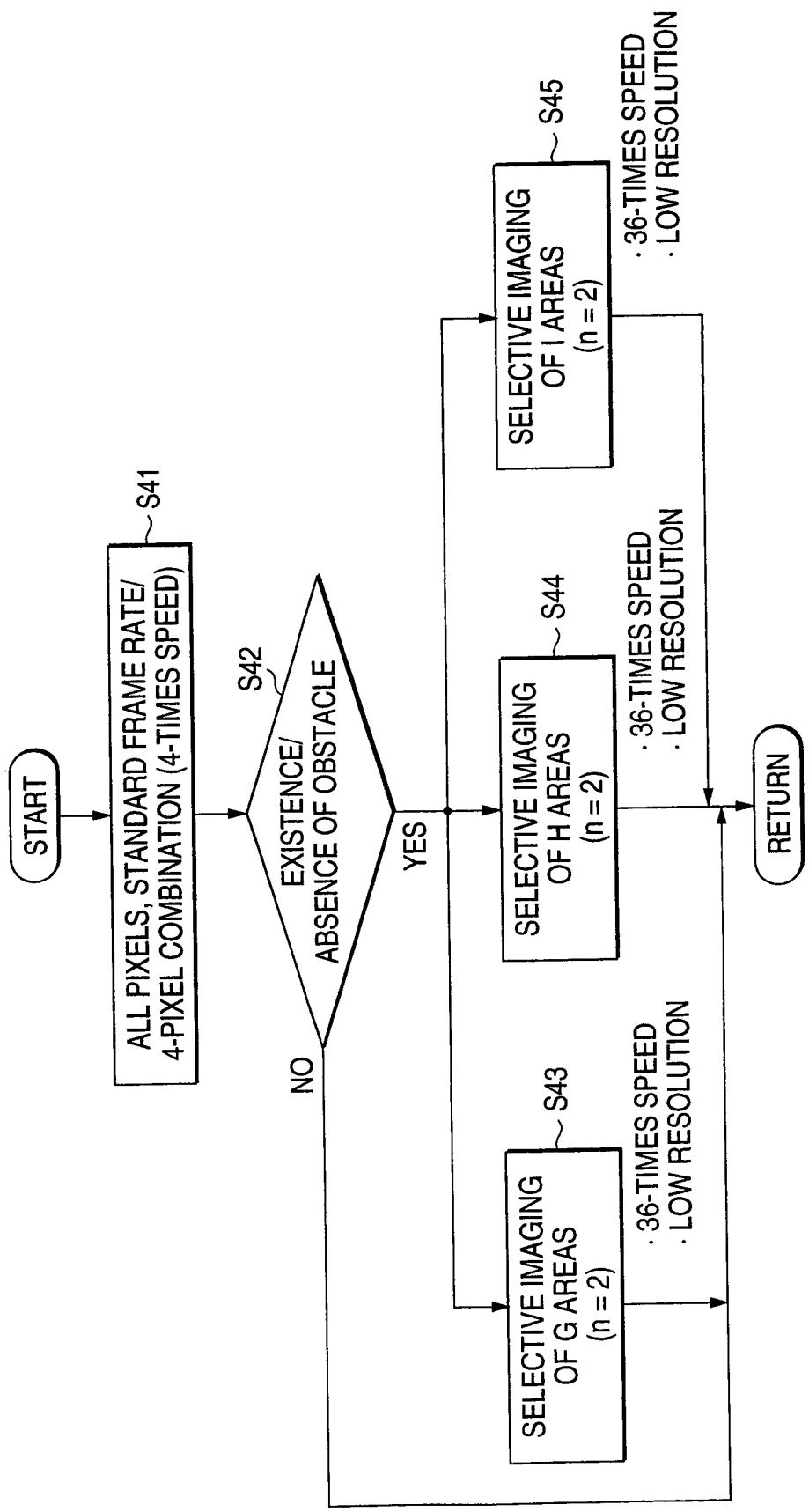

CAR-MOUNTED IMAGING APPARATUS AND DRIVING ASSISTANCE APPARATUS FOR CAR USING THE IMAGING APPARATUS

BACKGROUND OF THE INVENTION

1. Field of the Invention

This invention relates to a car-mounted imaging apparatus and a car driving assistance apparatus using the car-mounted imaging apparatus.

2. Description of the Related Art

Frame rates (number of imaging frames per second, unit: f/s) of imaging apparatuses such as a CCD (Charged Coupled Device) cameras and CMOS (Complementary Metal Oxide Semiconductor) cameras are generally follow those of television broadcasting and are fixed to 60 f/s (in the case of the NTSC system) and 50 f/s (in the case of the PAL system). In the case of a progressive (line sequential readout) type, the frame rate is ½ of the respective frame rate. Transfer rates of information imaged are fixedly determined by an information quantity of images and the frame rate. In this specification, this fixed frame rate will be assumed to be 30 f/s (that is, the progressive type of the NTSC system) for the sake of explanation. Incidentally, NTSC is the abbreviation of National Television Standards Committee and PAL is the abbreviation of Phase Alternation by Line.

On the other hand, various driving assistance apparatus for achieving traffic safety have been mounted in recent years to vehicles such as automobiles (hereinafter merely referred to as "cars") and their examples include an auto-cruise control system (ACC), a preceding car follow system, a collision prevention system and a pre-crush safety system.

These driving assistance apparatuses indispensably need an imaging apparatus that plays the role of "eye" of the system. Because the frame rate is fixed in the imaging apparatuses according to the prior art as described above, however, the imaging apparatus is not yet entire satisfactory for accurately imaging various obstacles such as those that are under a stationary state and those that move at a high speed.

In other words, to acquire an image having a high S/N ratio for stationary obstacles, it is preferred to elongate the imaging time per frame but the fixed frame rate cannot satisfy this requirement. For obstacle moving at a high speed, it is preferred to increase the number of imaging frames and to grasp from moment to moment the moving process of the obstacles, but the fixed frame rate cannot naturally satisfy the requirement. In practice, therefore, the imaging apparatus can correctly image only those obstacles that exhibit specific motion corresponding to the fixed frame rate.

The imaging apparatuses according to the prior art that are directed to eliminate these problems include the following two types. (1) To transfer a greater number of frames within a predetermined transfer rate, image signals of a high frame rate imaged by the imaging apparatus are passed through a "thin-out processing circuit" for executing frame thin-out processing and image signals having a desired frame rate are acquired within a predetermined transfer rate. (2) Clocks (that decide a horizontal/vertical driving cycle) to be applied to the imaging apparatus are changed to acquire image signals having a desired frame rate. (For detail of these imaging apparatuses, refer to patent reference 1, for example).

Patent Reference 1:
Japanese patent No. 3,129,599

However, the technologies of these imaging apparatuses of the prior art ((1), (2)) are not yet free from the following problems.

(1) The frame thin-out processing, that is, a processing for skipping a certain number of imaging frames, is executed to transfer the image signals having a high frame rate within a predetermined transfer rate. Therefore, the increase of overhead resulting from the thin-out processing is unavoidable, and image quality after the thin-out processing is deteriorated because the pixel information is lost to the extent corresponding to the frames thinned out.

(2) When the clock to be applied to the imaging apparatus is changed, the frame rate changes, too, in such a fashion as to follow the change of the clock. When the clock is merely changed, however, insufficiency of the charge build-up time occurs in the CCD cameras when the clock is set to a high value, for example, or the drop of the output voltage of a photo-diode occurs in the case of the CMOS cameras. In either case, the problem such as the drop of sensitivity and deterioration of the S/N ratio occurs inversely proportional to the frame rate.

SUMMARY OF THE INVENTION

It is therefore an object of the invention to provide a car-mounted imaging apparatus that makes a frame rate variable but does not invite the drop of sensitivity and deterioration of an S/N ratio without spoiling image quality, and a car driving assistance apparatus using the car-mounted imaging apparatus.

According to an aspect of the invention, there is provided a car-mounted imaging apparatus including two-dimensional imaging means having a large number of pixels arranged in a two-dimensional matrix, comprising pixel information addition means for combining a plurality of pixels, and adding and extracting pixel information of the pixels, wherein the number of combination of the pixels is changed so as to render a frame rate variable.

Here, the term "render a frame rate variable" means an improvement of the frame rate without increasing a transfer rate and without discarding image information. The term "two-dimensional imaging means" includes a CCD construction and a CMOS construction.

According to the invention, the frame rate is changed merely when the addition number of the pixel information is changed. Moreover, image quality can be kept without losing the information because the pixel information is added and extracted.

According to the prior art technologies, both frame rate and transfer rate are increased so as to improve the frame rate. Alternatively, the information is partially discarded to decrease the information quantity inside one frame and a high frame rate is achieved within the predetermined transfer rate. However, this method involves the demerit that an aspect ratio becomes different from the aspect ratio at a normal time. On the other hand, the invention conducts pixel addition to decrease the data quantity within the frame and makes it possible to transfer a greater number of frames within a predetermined transfer rate. As to image quality, the prior art technology discards the data by the thin-out means, but the invention achieves the object by adding the pixels. Therefore, the invention provides the effect similar to that of an averaging processing and minimizes the drop of image quality.

According to another aspect of the invention, there is provided a car-mounted imaging apparatus including two-dimensional imaging means having a large number of pixels arranged in a two-dimensional matrix, comprising pixel information addition means for combining a plurality of pixels, and adding and extracting pixel information of the pixels, and area designation means for designating areas for which the pixel information is added, wherein the number of combination of the pixels in the area is changed so as to render a frame rate in the area variable.

According to the invention, the frame rate of an arbitrary area within the imaging range is rendered variable.

According to still another aspect of the invention, there is provided a car driving assistance apparatus for imaging an image in front of an own car, judging whether or not any obstacle exists in front of the own car on the basis of the image so taken, and executing control for avoiding the obstacle or conducting pre-crush, wherein acquisition of the image is made through the car-mounted imaging apparatus as described above.

In the invention, the front of the own car is imaged at a variable frame rate and images having a suitable frame rate corresponding to the motion of obstacles in front of the car can be acquired.

According to still another aspect of the invention, there is provided a car driving assistance apparatus for imaging an image inside a cabin of an own car, judging whether or not a driver is a registered driver, whether or not any person exists on an assistant driver's seat or whether or not any person or persons exist on rear seats on the basis of the image so taken, and on the basis of the result of the judgement executing control for burglar proofing of the car, control for inhibiting expansion of an air bag of the assistant driver's seat or control for an effective operation of an air conditioner, wherein acquisition of the image is made through the car-mounted imaging apparatus as described above.

In this invention, the inside of the car is imaged at a variable frame rate and images having a suitable frame rate corresponding to existence/absence of a person on each seat can be acquired.

BRIEF DESCRIPTION OF THE DRAWINGS

FIG. 8 is a flowchart (long distance mode processing) of area switch control;

FIG. 9 is a flowchart (medium distance mode processing) of area switch control;

FIG. 10 is a flowchart (near distance mode processing) of area switch control.

DESCRIPTION OF THE PREFERRED EMBODIMENTS

Preferred embodiments of the invention will be hereinafter explained with reference to the accompanying drawings. Incidentally, it would be obvious to those skilled in the art that stipulation, actual examples and exemplification of numeric values, character strings and other signs and symbols of various details in the following explanation are merely for clarifying the concept of the invention and for reference only and do not in any way limit the scope of the invention. Though detailed explanation on known means, known procedures, known architectures and known circuit constructions (hereinafter called "known matters") will be avoided, they are employed to simplify the explanation and a part or the whole of these known matters are not intentionally excluded. Such known matters are known to those skilled in the art at the point of the application of this invention and are naturally contained in the following explanation.

Figure 1A:
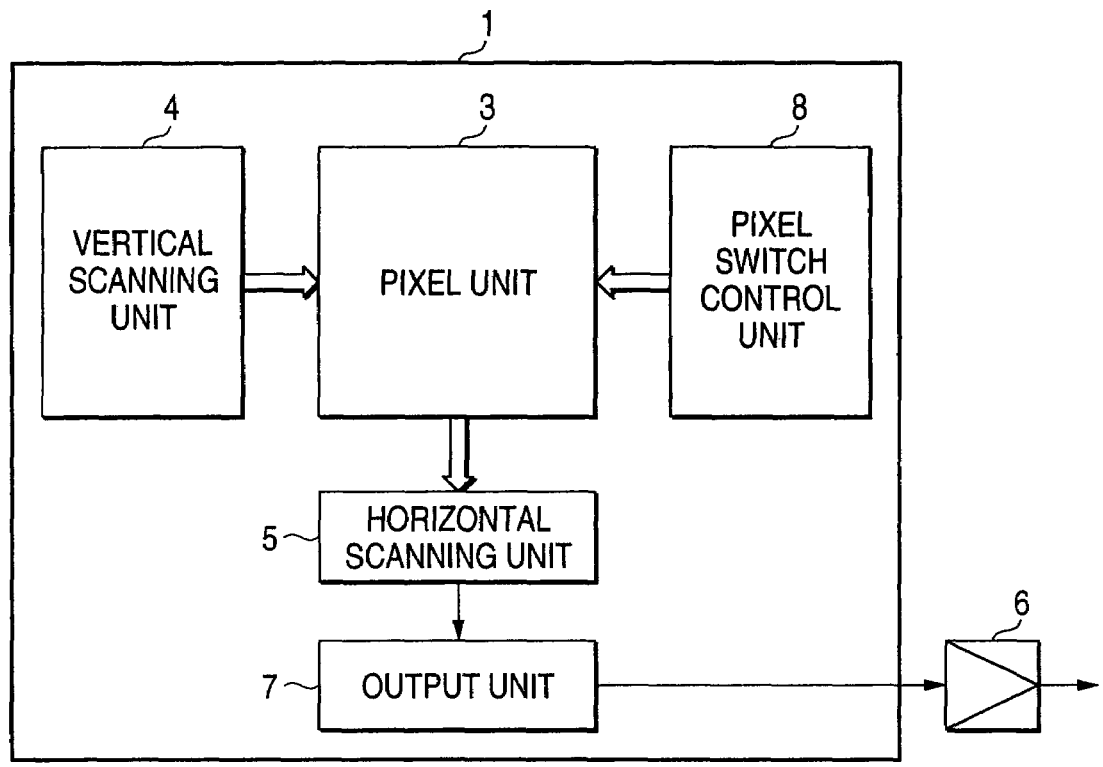
FIG. 1 is a conceptual block structural view of a car-mounted imaging apparatus according to an embodiment of the invention.
Figure 1B:
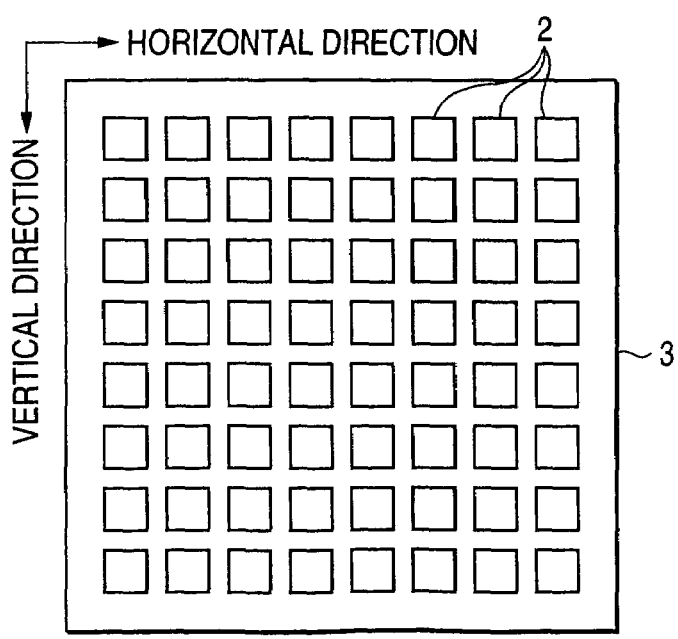

FIG. 1 is a conceptual block structural view of a car-mounted imaging apparatus according to an embodiment of the invention. The car-mounted imaging apparatus 1 is constituted by use of CMOS, though not particularly restrictive, and includes a pixel unit (or pixel array unit) 3 having a large number of pixels 2 arranged in a two-dimensional matrix, a vertical scanning unit 4 for scanning each pixel 2 of the pixel unit 3 in a vertical direction, a horizontal scanning unit 5 for scanning each pixel 2 of the pixel unit 3 in a horizontal direction, an output unit 7 for outputting a pixel signal read out through the horizontal scanning unit 5 to an analog-digital conversion unit 6, and a pixel switch control unit 8 that is a constituent element peculiar to this embodiment. The pixel unit 3, the vertical scanning unit 4, the horizontal scanning unit 5 and the output unit 7 correspond to two-dimensional imaging means and the pixel switch control unit 8 corresponds to pixel information addition means.

Figure 2A:
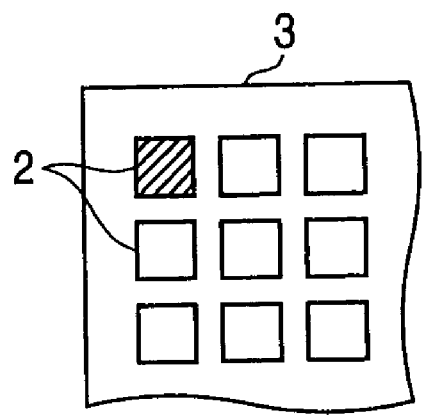
FIG. 2 is an image view of pixel switch control made by a pixel switch control unit 8.
Figure 2B:
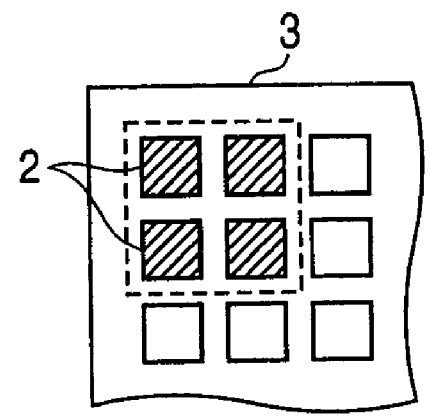
Figure 2C:
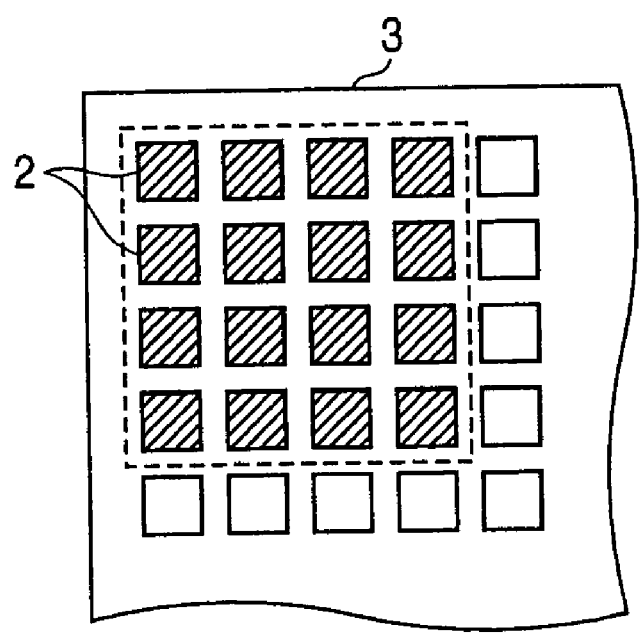

FIG. 2 is an image view of pixel switch control executed by the pixel switch control unit 8. In FIG. 2, (a) represents a standard readout state view. Each pixel 2 constituting the pixel unit 3 is individually controlled in this standard readout. In other words, pixel information of each pixel 2 is serially read out in accordance with the scanning operations executed by the horizontal scanning unit 4 and the horizontal scanning unit 5. Therefore, a frame rate of the car-mounted imaging apparatus 1 is a basic frame rate (30 f/s).

In the case of (b), in contrast, pixel information of $n^2$ pixels 2 contained in the range encompassed by dotted line (n=2 in the example shown) are added and read out as if they were only one pixel information. This readout will be hereinafter referred to as "n=2 pixel addition readout". Assuming, for example, that the number of pixels of the pixel unit 3 is "480 (number of vertical pixels)×640 (number of horizontal pixels) for convenience, the number of pixels of the pixel unit 3 is substantially reduced to "240×320" ($1/n^2$) in the case of n=2 pixel addition readout because 480÷n=480÷2=240 and 640÷n=640÷2=320. Therefore, the frame rate of n=2 pixel addition readout can be set to $n^2$ times ($30 \times n^2 = 30 \times 4 = 120$ f/s) the basic frame rate. Moreover, because the pixel information is added and read out in this case, quality of the image can be kept without losing the pixel information.

In the case of (c), n=4 contained in the range encompassed by dotted line. In this case, pixel information of $n^2$ pixels 2, that is, 4×4=16 pixels, are added and read out as if it were only one pixel information. This readout will be hereinafter referred to as "n=4 pixel addition readout". This is substantially equivalent to the case where the number of pixels of the pixel unit 3 is reduced to "120×160" ($1/n^2$). Therefore, the frame rate of n=4 pixel addition read out can be set to $n^2$ times (30×$n^2$=30×16=480 f/s) the basic frame rate. Moreover, because pixel information is added and read out in the same way as described above, quality of the image can be kept without losing pixel information.

Figure 3A:
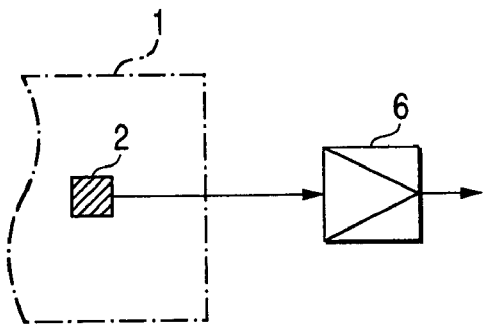
FIG. 3 is a conceptual view of three readout states (standard readout, n=2 pixel addition readout and n=4 pixel addition readout)
Figure 3B:
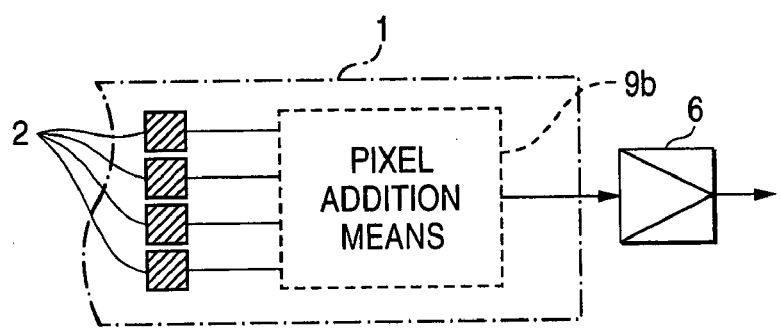
Figure 3C:
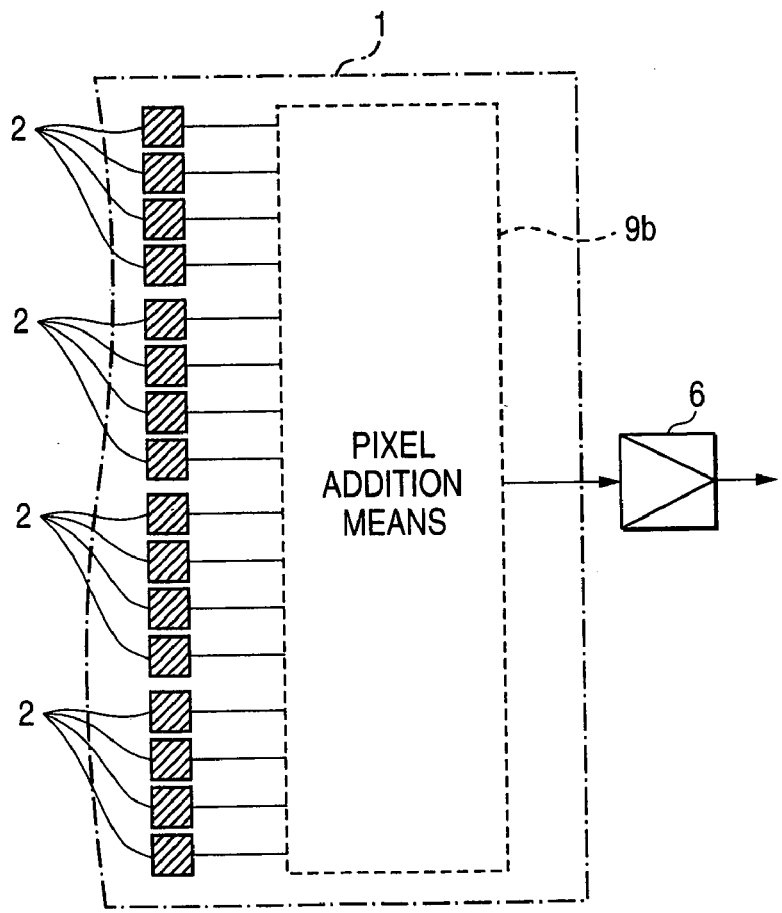

FIG. 3 is a conceptual view of the three readout states (a: standard readout, b: n=2 pixel addition readout, c: n=4 pixel addition readout) described above. In the case of standard readout, pixel information of each pixel 2 is individually taken out from the car-mounted imaging apparatus 1 and is inputted to the analog-digital conversion unit 6. In contrast, in the case of n=2 pixel addition readout, pixel information as the additional value of pixel information of 2×2 pixels 2 is taken out from the car-mounted imaging apparatus 1 and is inputted to the analog-digital conversion unit 6. In the case of n=4 pixel addition readout, pixel information as the additional value of pixel information of 4×4 pixels 2 is taken out from the car-mounted imaging apparatus 1 and is inputted to the analog-digital conversion unit 6.

In the drawing, pixel information addition means 9a and 9b add pixel information of 2×2 pixels 2 and pixel information of 4×4 pixels 2, respectively. However, these pixel information addition means 9a and 9b typically represent the operation of the pixel switch control unit 8.

Figure 4:
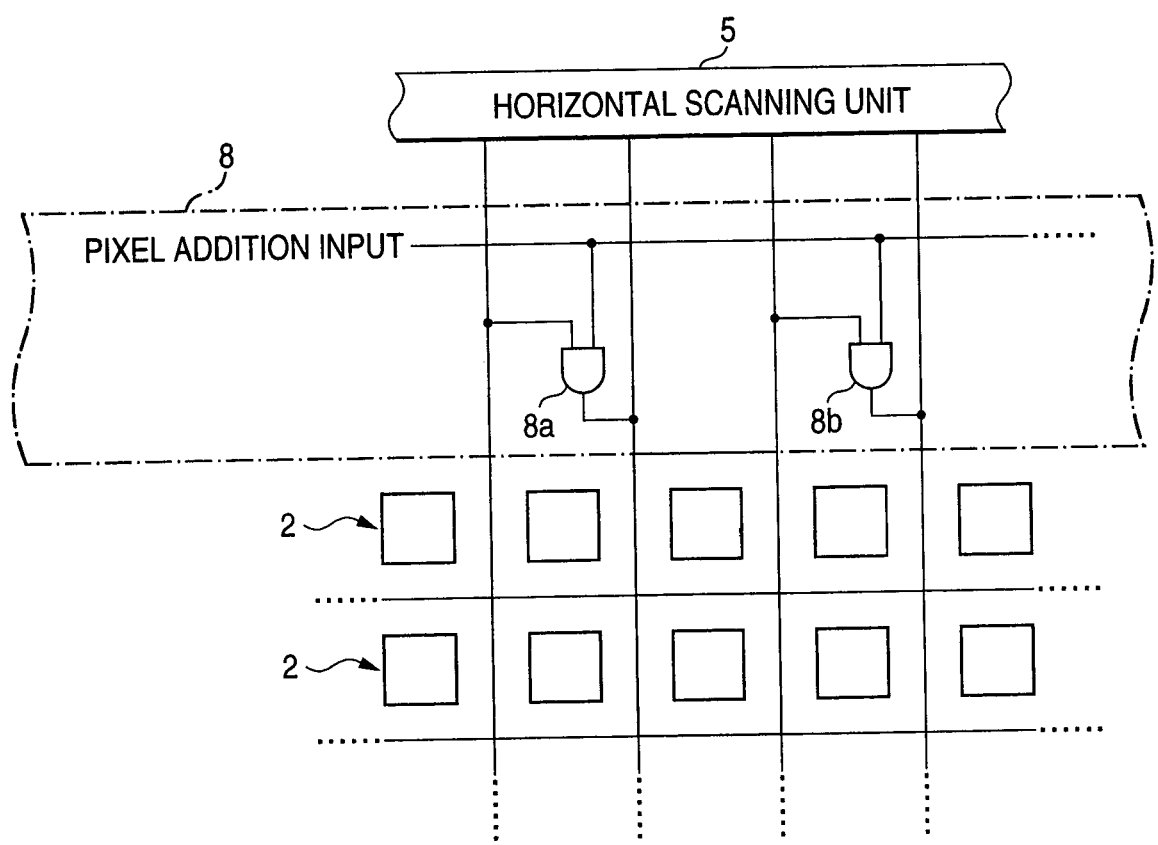
FIG. 4 is a partial structural view of the pixel switch control unit 8.

FIG. 4 is a partial structural view of the pixel switch control unit 8. In the drawing, the pixel switch control unit 8 includes a plurality of 2-input AND gates 8a, 8b, ... (only two of them are typically shown in the drawing). One of the inputs and the output of each 2-input AND gates 8a and 8b are connected to an adjacent horizontal scanning line and the pixel addition signal can be applied to the other input of each 2-input AND gate 8a, 8b. When the pixel addition signal is rendered inactive (L level), the readout mode is standard readout described above. When the pixel addition signal is rendered active (H level), the readout mode is n=2 pixel addition readout described above.

Incidentally, the drawing shows only the construction for adding in the row (horizontal) direction but omits the construction for adding in the column (vertical) direction to avoid complication of the drawing. Therefore, the same construction is employed in the column (vertical) direction, too. In other words, one of the inputs and the output of each 2-input AND gate, not shown, are connected to the adjacent vertical scanning line and the pixel addition signal can be applied to the other input of the 2-input AND gate.

According to the construction described above, it is possible to easily switch standard readout (frame rate→30 f/s) and n=2 pixel addition readout (frame rate→120 f/s) by rendering the pixel addition signal to active or not. Incidentally, when n=4 pixel addition readout is conducted, the 2-input AND gate may well be changed to a 4-input AND gate. Similarly, when n=X pixel addition readout is conducted, the 2-input AND gate may well be changed to an X-input AND gate. Here, $X=2^m$ and m is an integer other than 0 to 2.

In the explanation given above, all the pixels 2 (whole area) constituting the pixel unit 3 are the object of addition readout, but only a specific area may be the object of addition readout depending on the application of the car-mounted imaging apparatus 1. When the imaging apparatus 1 is for monitoring the front of the car, for example, it is only necessary for the car-mounted imaging apparatus 1 to sufficiently monitor a long distance during high speed driving or to sufficiently monitor medium and near distances during medium and low speed driving. In the case of such an application, it will be more convenient if the imaging apparatus 1 can add the pixels for a specific area, whenever necessary. For, the frame rate is variable for only a specific area and the imaging apparatus 1 can grasp every moment the obstacles such as preceding cars and pedestrians existing in this specific area.

Figure 5:
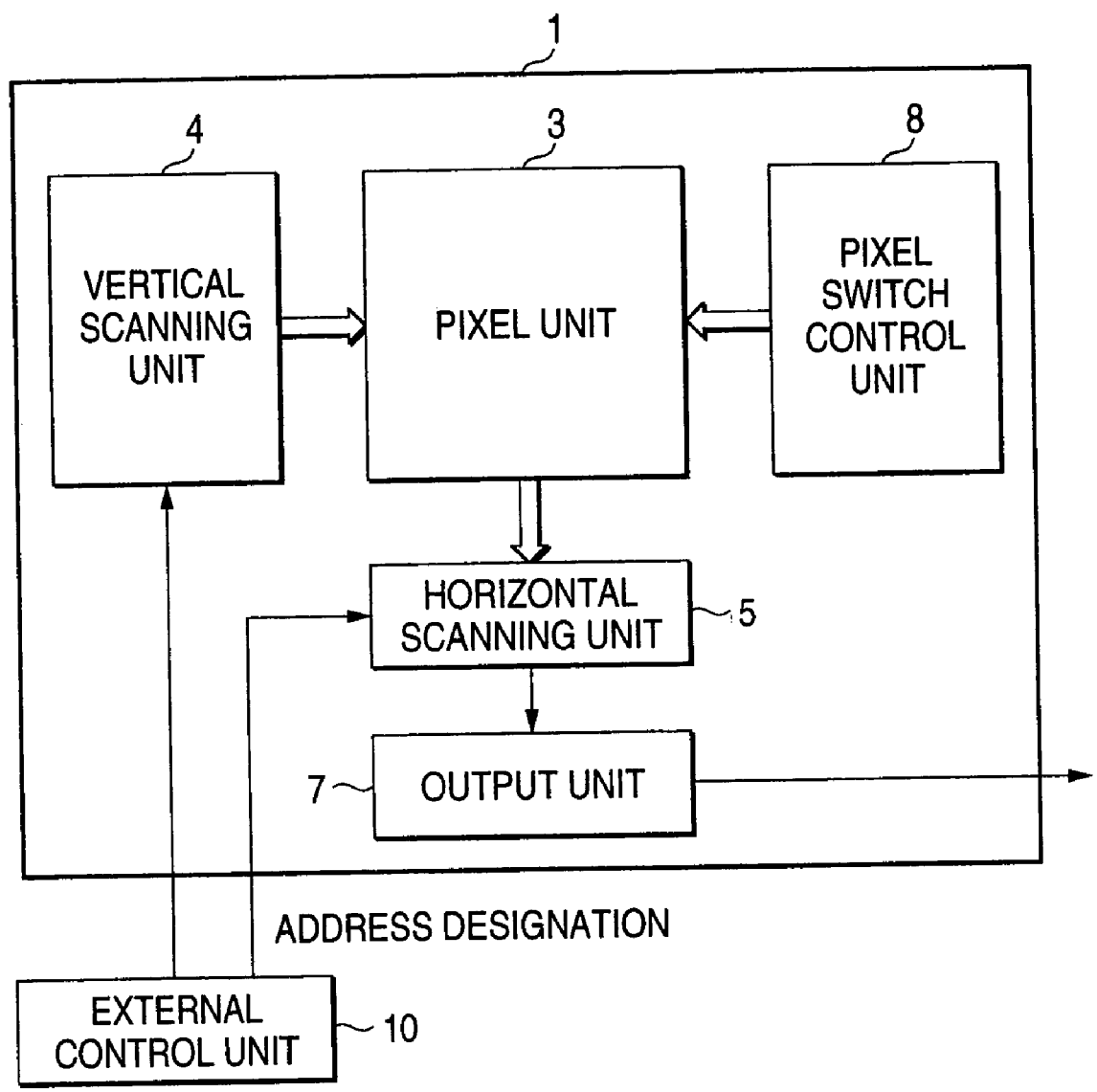
FIG. 5 shows an improved example where addition readout can be made for only a specific area.

FIG. 5 shows an improved example that can conduct addition readout for only a specific area. The differences from FIG. 1 reside in that an external control unit 10 generates the address (vertical/horizontal address) representing the specific area described above and inputs the address to the vertical scanning unit 4 and to the horizontal scanning unit 5, and that the pixels 2 within the range designated by the address are read out as the object of pixel addition. According to this construction, pixel information of the pixels 2 within the required range (specific area) can be added and read out at a high speed. The external control unit 10 corresponds to area designation means.

Next, an example of a driving assistance apparatus to which the car-mounted imaging apparatus 1 of the embodiment described above can be preferably applied will be explained.

Figure 6:
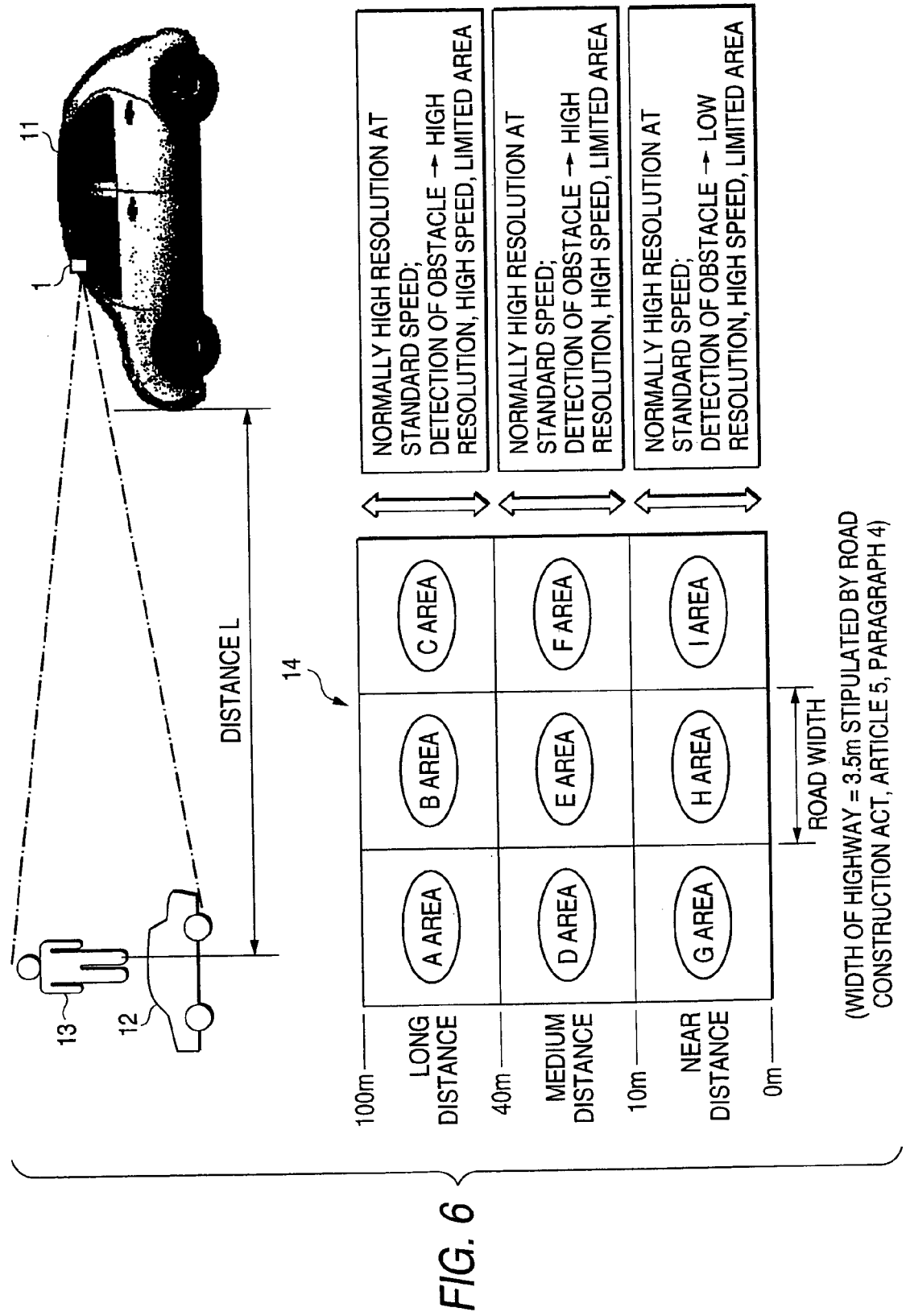
FIG. 6 shows a first example of a driving assistance apparatus.

FIG. 6 shows a first example of the driving assistance apparatus (hereinafter referred to as "first driving assistance apparatus"). The first driving assistance apparatus monitors the front of its own car by use of the car-mounted imaging apparatus 1 mounted to the car 11, catches the obstacles such as a preceding car 12 and a pedestrian 13, judges a danger and takes measures such as speed control, brake control, warning control and measures (pre-tension of seat belt, etc) for unavoidable collision (so-called "pre-crush").

In the drawing, the imaging area 14 of the car-mounted imaging apparatus 1 is divided into a plurality of areas (3×3=9 areas in the drawing). This area division is achieved by applying the improved example capable of adding and reading out only a specific area as shown in FIG. 5.

Incidentally, the area is equally divided into 3×3 in the example shown in the drawing, but the area division is not limited to this example. For example, the area division may be made unequally as to the far-near direction in such a fashion that the near distance portion becomes broad and the long distance portion is narrow. Similarly, the area division may be made unequally as to the transverse direction, too. In the image taken, the lane width of the own car becomes broad in the near distance portion and becomes narrow in the long distance portion. Therefore, the size of the divided area may also be changed in accordance with the distance.

These areas will be hereby called "A area, B area, C area, ..., I area" for convenience. The A, B and C areas are the long distance image areas in front of the own car. The D, E and F areas are the medium distance image areas in front of the own car. The G, H and I areas are the near distance image areas in front of the own car. Here, the term "long distance" means a distance that the headlight of the car can reach and is concretely from about 40 to about 100 m in front of the car, for example. The term "medium distance" means a distance smaller than the long distance and is about 10 to about 40 m in front of the car, for example. The term "near distance" means a distance of from about 0 to about 10 m immediately in front of the car, for example. Needless to say, these values of the distances have no specific significance but merely represent the examples of the long distance, the medium distance and the near distance.

Among the areas, the width of the three areas at the center (B area, E area and H area) is preferably coincident with or equal to the width of the driving lane (own car lane). The left three areas (A area, D area and G area) correspond to the left lane (or left end white line of the own car lane) and the right three areas (C area, F area and I area) correspond to the right lane (or right end white line of the own car lane).

As will be also understood from a "flowchart of area switch control" that will be described later, these areas are selectively used in accordance with the driving speed of the own car. During high speed driving, for example, the A, B and C areas are used to monitor the long distance. When any obstacle is detected in these areas during high speed driving, the areas are checked more closely (to limit the areas to any of the A, B and C areas) in order to acquire more detailed information. The D, E and F areas or the G, H and I areas are used during medium/low speed driving to monitor the medium/near distance. When any obstacle is detected in these areas during medium/low speed driving, the areas are checked more closely (to limit the areas to the D, E and F areas or the G, H and I areas) to acquire more detailed information.

In other words, resolution is normally high and the driving speed is normally the standard speed in the long distance. When any obstacle is detected, however, the area is switched to the high-speed limit area having high resolution. In the medium distance, resolution is normally high and the driving speed is normally the standard speed. When any obstacle is detected, however, the area is switched to the high-speed limit area having high resolution. In the near distance, resolution is normally high and the driving speed is normally the standard speed. When any obstacle is detected, however, the area is switched to the high-speed limit area having low resolution. Here, the term "standard speed" means 30 or 60 f/s and the term "high speed" means some integral multiples of the standard speed. The term "high resolution" means 640×480 and the term "low resolution" does 160×120. However, the term "160×120" does not mean that readout is made in this size. The term represents the case of n=2 and that the size of the frame is compressed to 160×120 as a whole. The readout size becomes further smaller.

FIGS. 7 to 10 show flowcharts of area switch control.

<Car Speed Judgment>

Figure 7:
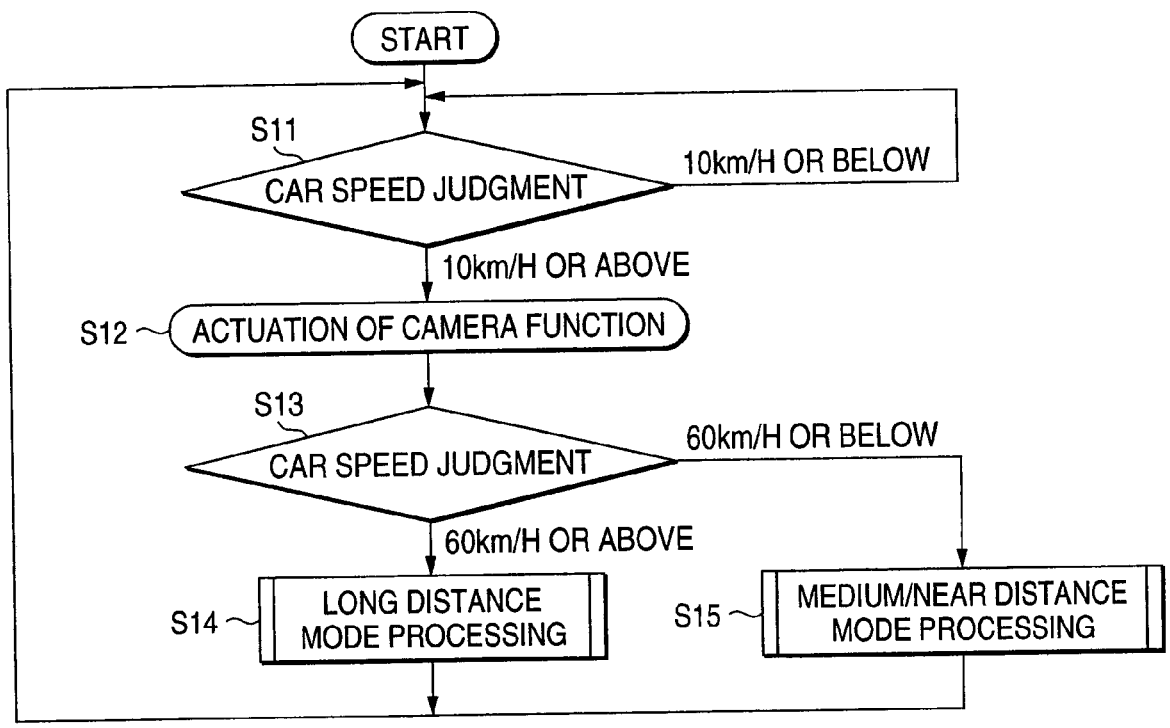
FIG. 7 is a flowchart (car speed judgment) of area switch control.

Referring to FIG. 7, whether or not the own car is under driving is first judged (Step S11). This judgment is based on the speed of the own car (hereinafter referred to as "own car speed"). When the own car speed is 10 Km/h or more, for example, the car is judged as "driving". When the car is not under driving, the driving judgment step (Step S11) is looped. When the car is judged as driving, the flow comes off from the loop, the power source of the car-mounted imaging apparatus 1 is turned ON to actuate the camera function (Step S12) and the own car speed judgment is again made (Step S13).

This own car speed judgment judges whether or not the own car is driving at a high speed. When the own car speed is 60 Km/h or more, for example, the car is judged as being under "high speed driving" and when not, as "non high speed driving (or medium/low speed driving)". When the car is judged as high speed driving, "long distance mode processing" is executed (Step S14). When the car is judged as medium/low speed driving, on the other hand, "medium/near distance mode processing" is executed (Step S15). In either case, the respective mode processing is executed and then the flow returns again to Step S11, thereby repeating the loop.

Incidentally, the medium distance mode and the near distance mode are put together and are called hereby the "medium/near distance mode" for the sake of explanation. However, the medium distance mode processing and the near distance mode processing are executed separately as will be explained later (see FIGS. 9 and 10). Therefore, it is possible to set a customary mode of 60 Km/hr or below to the medium distance mode and to switch it to the near distance mode when any obstacle is detected in the customary mode (the medium distance mode).

<Long Distance Mode Processing>

In FIG. 8, the car-mounted imaging apparatus 1 is first set to the basic frame rate (Step S21) and the "standard readout" state for individually reading out each pixel 2 of the pixel unit 3 is selected as shown in FIGS. 2(a) and 3(a). Under this readout state, the imaging area 14 (see FIG. 6) of the car-mounted imaging apparatus 1 is imaged as one image as a whole and area division is not made. Therefore, a broad area image containing the full distance range from the long distance to the near distance, the driving lane of the own car and the right and left adjacent lanes (or the left sidewalk and opposite lanes) can be acquired.

Next, whether or not this broad area image contains any obstacle (preceding cars, pedestrians, etc) is judged (Step S22). In this step, it is possible to extract a profile of an article from the broad area image and to judge that "preceding car exists" when the size of the article corresponds to a reference size corresponding to a car and that "pedestrian exists" when the size of the article corresponds to a reference size corresponding to the size of a human body. It is further possible to calculate frame correlation of the broad area image to calculate the moving speed of the article, and to judge whether or not the article has the danger of collision with the own car from the relative value between the measurement value and the car speed of the own car.

When no obstacle is detected in Step S22 described above, the flow returns to the flow shown in FIG. 7. When any obstacle is detected, the car-mounted imaging apparatus 1 is set to the high frame rate and the long distance areas (A, B and C areas) are imaged (Steps S23 to S25). Incidentally, the example shown in the drawing represents the case where the A, B and C areas are imaged in parallel but this method is not restrictive. In other words, imaging may be serially conducted. In Step S23, the own car lane area (B area) of the long distance and the left lane area (A area) are imaged, the own car lane area (B area) of the long distance and the right and left lane areas (A and C areas) are imaged in Step S24, and the own car lane area (B area) of the long distance and the right lane area (C area) are imaged in Step S25.

As described above, the frame rate when imaging two areas (Steps S23 and S25) is 9/2 (9: total number of division of area, 2: number of imaging object areas) of the basic frame rate. In other words, the high frame rate of 9/2 times (4.5 times) the basic frame rate can be substantially achieved. The frame rate when imaging the three areas (Step S24) is 9/3 (9: total number of division of area, 3: number of imaging object areas) the basic frame rate. Therefore, the high frame rate of substantially 9/3 (=3 times) the basic frame rate can be achieved.

Consequently, the obstacle in the long distance can be imaged at the high frame rate with high resolution. Particularly because the obstacle can be imaged at the high frame rate, the movement of the obstacle having a high moving speed can be correctly grasped from moment to moment. As a result, it becomes possible to detect at an early time any obstacle that may impart danger to the own car and to take suitable measure such as pre-crush.

<Medium Distance Mode Processing>

Referring to FIG. 9, the car-mounted imaging apparatus 1 is first set to the high frame rate (to the aforementioned n=2 pixel addition readout, for example) (Step S31). Under this readout state, the whole imaging range 14 of the car-mounted imaging apparatus 1 (see FIG. 6) is imaged as one image as a whole. Because pixel addition is made and the frame rate is set to the high frame rate (frame rate of 4 times in the case of n=2 pixel addition readout, for example), it is possible to correctly grasp from moment to moment the movement of the obstacle having a high moving speed and to detect at an early time any obstacle that may impart danger to the own car.

Next, the existence/absence of the obstacles (preceding cars, pedestrians, etc) is judged (Step S32). When the obstacle is not detected, the flow returns to the flow shown in FIG. 7. When any obstacle is detected, on the other hand, the car-mounted imaging apparatus 1 is set to the high frame rate and the medium distance areas (D, E and F areas) are imaged (Steps S33 to S35). Incidentally, though the example shown in the drawing represents the case where the D, E and F areas are imaged in parallel, this method is not restrictive. These areas may be imaged serially. In Step S33, the own car lane area (E area) of the medium distance and the left lane area (D area) are imaged. In Step S34, the own car lane area (E area) of the medium distance and the right and left lane areas (D and F areas) are imaged. In Step S35, the own car lane area (E area) of the medium distance and the right lane area (F area) are imaged.

The frame rate when imaging two areas (Steps S33 and S35) is $n^2 \times 9/2$ (9: total number of division of area, 2: number of imaging object areas) of the basic frame rate. In other words, the high frame rate of $n^2 \times 9/2$ times (18 times because n=2) the basic frame rate can be substantially achieved. The frame rate when imaging the three areas (Step S34) is $n^2 \times 9/3$ (9: total number of division of area, 3: number of imaging object areas) the basic frame rate. Therefore, the high frame rate of substantially $n^2 \times 9/3$ (=12 times because n=2) the basic frame rate can be achieved.

Consequently, the obstacle in the medium distance can be imaged at the high frame rate with high resolution. Particularly because the obstacle can be imaged at the high frame rate, the movement of the obstacle having a high moving speed can be correctly grasped from moment to moment. As a result, it becomes possible to detect at an early time any obstacle that may impart danger to the own car and to take suitable measure such as pre-crush.

<Near Distance Mode Processing>

Referring to FIG. 10, the car-mounted imaging apparatus 1 is first set to the high frame rate (to the aforementioned n=2 pixel addition readout, for example) (Step S41). Under this readout state, the whole imaging range 14 of the car-mounted imaging apparatus 1 (see FIG. 6) is imaged as one image as a whole. Because pixel addition is made and the frame rate is set to the high frame rate (frame rate of 4 times in the case of n=2 pixel addition readout, for example), it is possible to correctly grasp from moment to moment the movement of the obstacle having a high moving speed and to detect at an early time any obstacle that may impart danger to the own car.

Next, the existence/absence of the obstacles (preceding cars, pedestrians, etc) is judged (Step S42). When the obstacle is not detected, the flow returns to the flow shown in FIG. 7. When any obstacle is detected, on the other hand, the car-mounted imaging apparatus 1 is set to the high frame rate and the near distance areas (G, H and I areas) are imaged (Steps S43 to S45). Incidentally, though the example shown in the drawing represents the case where the G, H and I areas are imaged in parallel, this method is not restrictive. These areas may be imaged serially. In Step S43, the left car lane area (G area) of the near distance is imaged. In Step S44, the own car lane area (H area) of the near distance is imaged. In Step S45, the right car lane area (I area) of the near distance is imaged.

The frame rate when imaging one area (Steps S43 to S45) at the 4-time speed is $n^2 \times 9/1$ (9: total number of division of area, 1: number of imaging object area) of the basic frame rate. In other words, the high frame rate of $n^2 \times 9/1$ times (36 times because n=2) the basic frame rate can be substantially achieved.

Consequently, the obstacle in the medium distance can be imaged at the high frame rate with high resolution. Particularly because the obstacle can be imaged at the high frame rate, the movement of the obstacle having a high moving speed can be correctly grasped from moment to moment. As a result, it becomes possible to detect at an early time any obstacle that may impart danger to the own car and to take suitable measure such as pre-crush.

As described above, the embodiment of the invention can provide the following advantages.

(1) Because pixel addition readout accomplishes the high frame rate, the invention can provide the car-mounted imaging apparatus 1 that does not deteriorate image quality and moreover does not either invite the drop of sensitive and the S/N ratio and the car driving assistance apparatus using the car-mounted imaging apparatus 1.

(2) Because the invention can make pixel addition readout for only a specific area, the invention can conduct pixel addition readout by selecting a suitable area corresponding to the distance of the obstacle in front of the own car when the invention is applied to the driving assistance apparatus for monitoring the front of the own car, for example, and can improve accuracy of front monitoring.

(3) According to the prior art technology, the frame rate is increased together with a transfer rate to improve the frame rate, and a high frame rate is accomplished within a predetermined range of the transfer rate by discarding information to reduce the information quantity inside one frame. This method invites the demerit that the aspect ratio changes from the ratio at the normal time. In contrast, the invention reduces the data quantity inside the frame by conducting pixel addition and makes it possible to conduct greater frame transfer within a predetermined range of the transfer rate. As to image quality, the prior art technology discards data by thin-out means but the invention achieves the object by adding the pixels. This method provides the effect similar to that of an averaging processing and can keep the drop of image quality minimal.

Incidentally, the application of the car-mounted imaging apparatus 1 according to the embodiment of the invention is not limited to the driving assistance apparatus (for monitoring the front of the own car) described above.

Figure 11A:
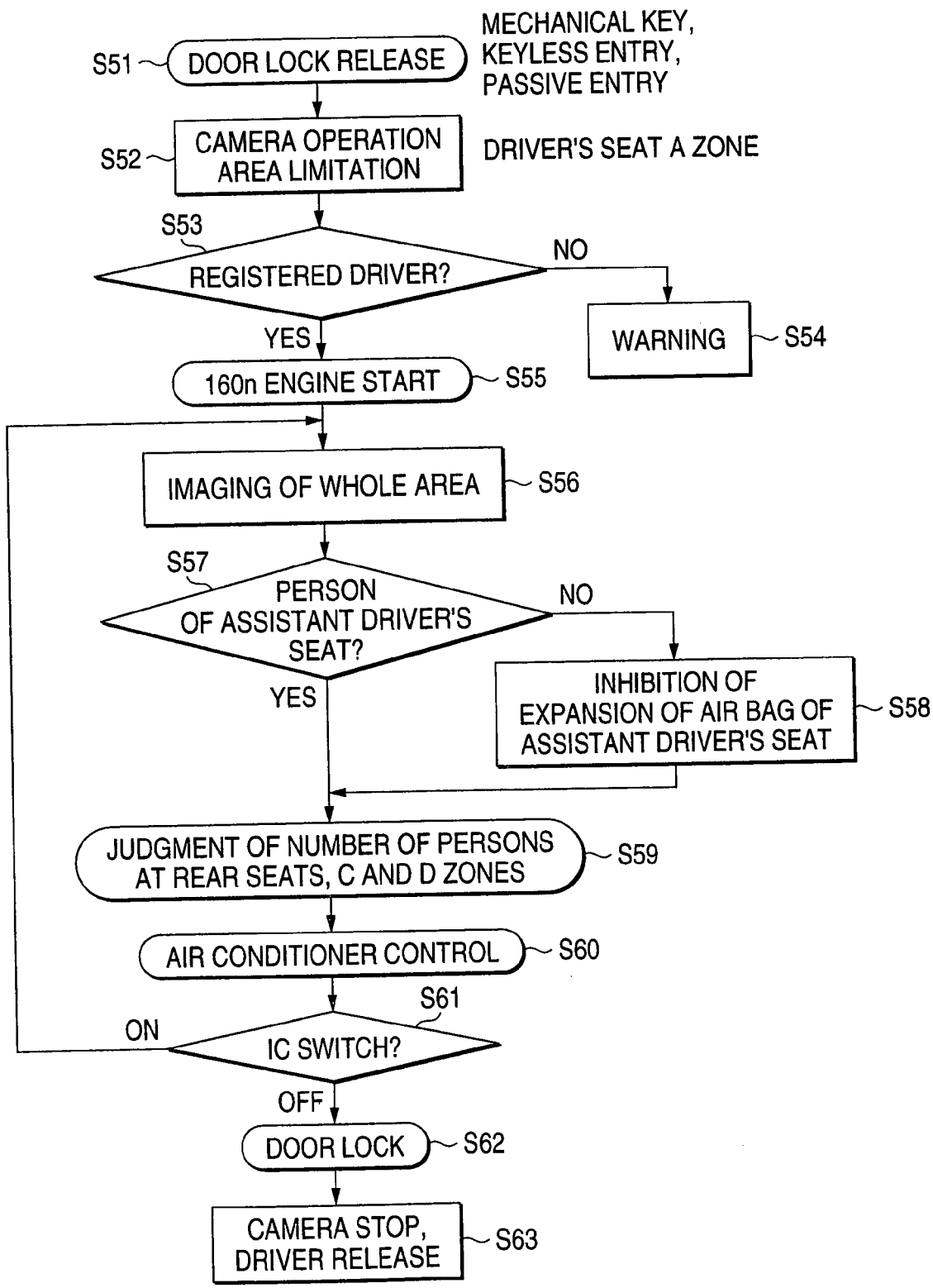
FIG. 11 shows a second example of the driving assistance apparatus.
Figure 11B:
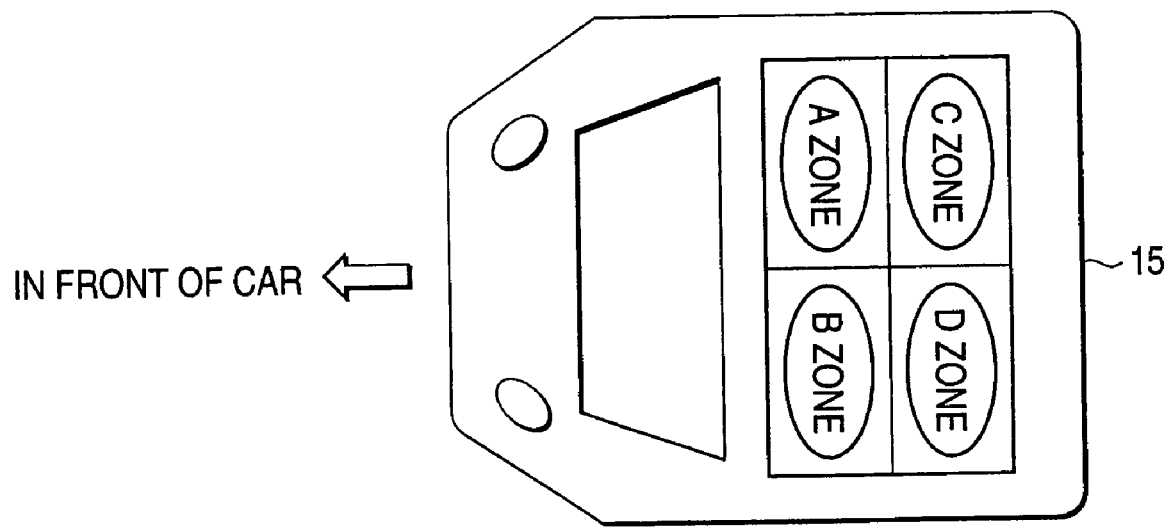

FIG. 11 is a conceptual operation flowchart of another driving assistance apparatus (hereinafter referred to as "second driving assistance apparatus") to which the car-mounted imaging apparatus 1 of the embodiment is preferably applied. In this second driving assistance apparatus, the car-mounted imaging apparatus 1 images the inside of the own car 15. Whether or not any person exists at the driver's seat, whether or not any person exists at the assistant driver's seat and whether or not any persons exist at the rear seats (in the case of a car for 4 or more passengers) is judged from the image so acquired. Various processing are executed in accordance with the judgment result.

The operation of the driving assistance apparatus starts when a door lock is released (Step S51). When the operation starts, the operation of the driving assistance apparatus limits the imaging range of the car-mounted imaging apparatus 1 to a specific zone (corresponding to the area described above) (Step S52). This specific zone is the one that includes a driver's seat (A zone in the drawing). Therefore, it is possible to judge from the image of the A zone whether or not a person exists at the driver's seat.

It is preferred hereby to judge not only "whether or not any person exists at the driver's seat" but also whether or not the person is registered as the "driver". For, when the person is not registered, the person may be an illegal doer (person intending to steal the car). Therefore, when the person is judged as the unregistered person ("NO" in Step S), warning such as sounding of the horn is made (Step S54) as effective burglarproofing of the car.

Incidentally, the technology described in "Pedestrian Observation Apparatus, Pedestrian Recognition System Using the Apparatus, Door Opening/Closing System and Building" (JP-A-2001-16573) field by the present applicant can be applied to the judgment algorithm as to "whether or not the person is registered" in Step S53.

On the other hand, when the person sitting on the driver's seat is judged in Step S53 as the registered person, engine start is permitted (Step S55) and the imaging zone of the car-mounted imaging apparatus 1 is set to all the zones (A to D zones in the drawing) after the engine start (Step S56). Various processing corresponding to the existence/absence of the persons on the assistant driver's seat or on the rear seats are executed on the basis of the image so taken. For example, whether or not any person exists in the B zone (assistant driver' seat) is judged (Step S27). When no person exists on the assistant driver's seat, expansion of an air bag of the assistant driver's seat is inhibited (Step S58) or the number of persons on the rear seats is judged (Step S59), or the temperature of an air conditioner, its wind quantity and its wind direction are controlled (Step S60).

Such adaptation control is repeatedly made until the ignition switch is turned OFF (Step S61). When the ignition switch is turned OFF, the operation of the car-mounted imaging apparatus 1 is stopped after confirming door lock (Step S62) and stipulation of the driver is released (Step S63).

According to this embodiment, the car-mounted imaging apparatus 1 can image the inside of the car by each seat (zone). It becomes thus possible to effectively judge the unregistered driver, to inhibit expansion of the air bag of the assistant driver's seat and to control the air conditioner in accordance with the number of passengers on the basis of the zone image.

The car-mounted imaging apparatus according to the invention can change the frame rate by merely changing the addition number of pixel information and can moreover keep quality of the image without losing information because the pixel information is added and extracted. Therefore, the invention can provide the car-mounted imaging apparatus that makes the frame rate changeable but does not invite the drop of the sensitivity and deterioration of the S/N ratio without spoiling image quality. Alternatively, the invention can make the frame rate of an arbitrary area inside the imaging range.

The car driving assistance apparatus according to the invention can image the front of the own car at the variable frame rate and can acquire the images at the suitable frame rates corresponding to the motion of the obstacle in front of the own car. Alternatively, the driving assistance apparatus can image the inside of the car at the variable frame rates and can acquire the image at the suitable frame rates corresponding to the existence/absence of the person on each seat.

What is claimed is:

1. A system including an imaging means having pixels arranged in a two-dimensional matrix, comprising:
   pixel information addition means for combining pixel information for a number of said pixels and selectively extracting the combined pixel information,
   wherein a frame rate of the imaging means is variable and dependent on the number of said pixels,
   wherein the system is a car-mounted imaging apparatus, the system further comprising:
   a car driving assistance apparatus for:
   rendering an image in front of a car,
   based on the image, determining an existence/absence of an obstacle in front of the car, and
   executing control to selectively response to the obstacle,
   wherein the image is acquired by the car-mounted imaging apparatus, and
   wherein, if an obstacle is detected, the frame rate is increased.

2. A system including an imaging means having pixels arranged in a two-dimensional matrix, comprising:
   pixel information addition means for combining pixel information for a number of said pixels and selectively extracting the combined pixel information,
   wherein a frame rate of the imaging means is variable and dependent on the number of said pixels,
   wherein the system is a car-mounted imaging apparatus, the system further comprising:
   a car driving assistance apparatus for:
   imaging an image inside a cabin of a car,
   based on the image, determining at least one of whether a driver is a registered driver, whether a person exists in a assistant driver's seat, and whether a person exists in rear seats, and
   based on the determining, executing control for at least one of burglarproofing of the car, inhibiting expansion of an air bag of the assistant driver's seat, and an effective operation of an air conditioner,
   wherein the image is acquired by the car-mounted imaging apparatus.

3. A system including an imaging means having pixels arranged in a two-dimensional matrix, comprising:
   pixel information addition means for combining pixel information for a number of said pixels and selectively extracting the combined pixel information,
   wherein a frame rate of the imaging means is variable and dependent on the number of said pixels,
   the system further comprising area designation means for designating at least one area in the imaging means, wherein the number of said pixels are located in the at least one area,
   wherein the system is a car-mounted imaging apparatus, the system further comprising:
   a car driving assistance apparatus for:
   rendering an image in front of a car,
   based on the image, determining an existence/absence of an obstacle in front of the car, and
   executing control to selectively response to the obstacle, wherein the image is acquired by the car-mounted imaging apparatus, and wherein the area designation means designates the area in the imaging means associated with a speed of the car.

4. A system including an imaging means having pixels arranged in a two-dimensional matrix, comprising:

pixel information addition means for combining pixel information for a number of said pixels and selectively extracting the combined pixel information, wherein a frame rate of the imaging means is variable and dependent on the number of said pixels, the system further comprising area designation means for designating at least one area in the imaging means, wherein the number of said pixels are located in the at least one area, wherein the system is a car-mounted imaging apparatus, the system further comprising:

a car driving assistance apparatus for:

imaging an image inside a cabin of a car, based on the image, determining at least one of whether a driver is a registered driver, whether a person exists in a assistant driver's seat, and whether a person exists in rear seats, and based on the determining, executing control for at least one of burglarproofing of the car, inhibiting expansion of an air bag of the assistant driver's seat, and an effective operation of an air conditioner, wherein the image is acquired by the car-mounted imaging apparatus.

* * * * *